United States Patent [19]

Inoue

[11] Patent Number: 4,854,123
[45] Date of Patent: Aug. 8, 1989

[54] METHOD FOR REMOVAL OF NITROGEN OXIDES FROM EXHAUST GAS OF DIESEL ENGINE

[75] Inventor: Akira Inoue, Hirakata, Japan

[73] Assignee: Nippon Shokubai Kagaku Kogyo Co., Ltd., Osaka, Japan

[21] Appl. No.: 148,877

[22] Filed: Jan. 27, 1988

[30] Foreign Application Priority Data

Jan. 27, 1987 [JP] Japan .................... 62-15290

[51] Int. Cl.⁴ ............................. F01N 3/20
[52] U.S. Cl. ........................ 60/274; 60/286; 60/301
[58] Field of Search ............ 60/274, 301, 286

[56] References Cited

U.S. PATENT DOCUMENTS 3,896,616 7/1975 Keith ..................... 60/301
4,085,193 4/1978 Nakajima et al. .
4,188,364 2/1980 Gladden .
4,403,473 9/1983 Gladden ................. 60/274

FOREIGN PATENT DOCUMENTS 2249411 4/1974 Fed. Rep. of Germany .
2254367 7/1975 France .

Primary Examiner—Douglas Hart
Attorney, Agent, or Firm—Burns, Doane, Swecker & Mathis

[57] ABSTRACT

A method for the removal of nitrogen oxides from the exhaust gas of a diesel engine through catalytic reduction by the use of honeycomb catalyst in the presence of ammonia, which method comprises feeding ammonia into said exhaust gas proportionately to the product of the revolution number of said diesel engine multiplied by the torque of said diesel engine.

8 Claims, 2 Drawing Sheets

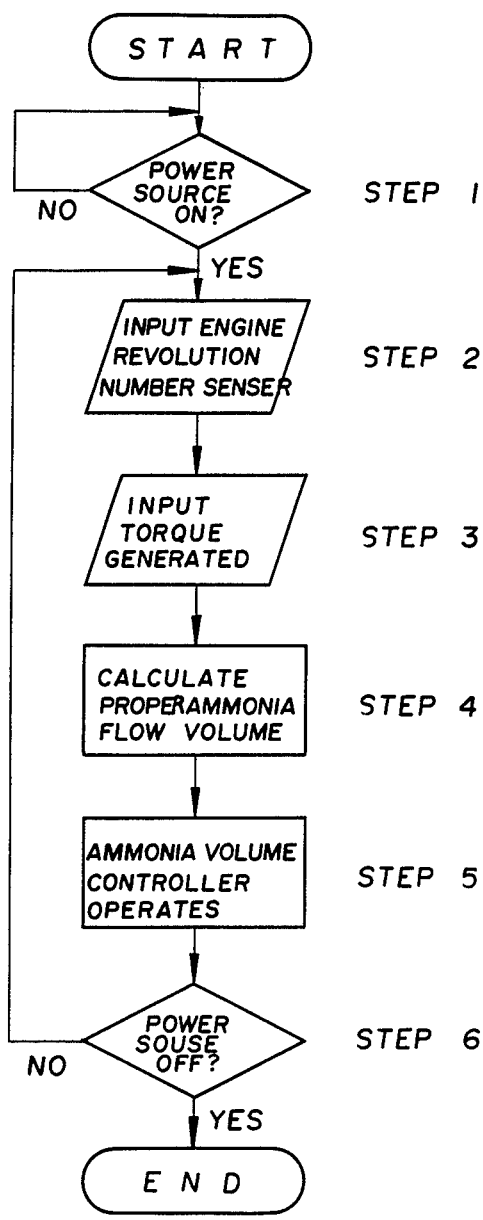

METHOD FOR REMOVAL OF NITROGEN OXIDES FROM EXHAUST GAS OF DIESEL ENGINE

BACKGROUND OF THE INVENTION

1. Field of the Invention

This invention relates to a method for the removal of nitrogen oxides from an exhaust gas of a diesel engine. More particularly, it relates to a method for the removal by catalytic reduction in the presence of ammonia of nitrogen oxides (hereinafter referred to as "$NO_x$") which are contained in the exhaust gas from such diesel engine automobiles as trucks and buses, the exhaust gas from diesel engine generators, and the exhaust gas from stationary diesel engines, for example. Especially, this invention relates to a method for the removal of $NO_x$ by the contact of the exhaust gas with a honeycomb catalyst in the presence of ammonia, which method is such as to enable the removal of $NO_x$ to be effected efficiently in real-time conformity with the variation in the behavior of the exhaust gas and, at the same time, repress the inclusion of ammonia in the exhaust gas departing from the site of $NO_x$ removal.

2. Description of the Prior Art

Heretofore, as a purifying catalyst for the exhaust gas emanating from an internal combustion engine, particularly a gasoline engine automobile, the so-called three-way catalyst capable of simulataneously removing $NO_x$, CO (carbon monoxide), and HC (hydrocarbons) from the exhaust gas has been widely used.

The three-way catalyst functions most effectively while the gasoline engine is being operated under a reducing atmosphere with the air-to-fuel (A/F) ratio kept in the proximity of the chemical equivalent point. While the automobile car is in motion, therefore, the gasoline engine is generally controlled with an electronically controlled injection device, for example, to maintain the A/F ratio at a constant level. Studies have been continued to date with a view to developing a catalyst which effects efficient removal of $NO_x$, CO, and HC under the conditions permitting maintenance of this constant A/F ratio. So far, numerous catalysts using such precious metals as platinum, palladium, and rhodium have been proposed.

In the case of a diesel engine which is likewise an internal-combustion engine, however, the exhaust gas has a very high oxygen concentration in the range of 4 to 20% and remains in an oxidizing atmosphere of an oxygen-rich gas composition. When the three-way catalyst is used for the removal of $NO_x$ from this exhaust gas, it has been known that the removal of $NO_x$ is attained only with great difficulty because the CO and HC components in the exhaust gas intended to serve as reducing agents are spent out by oxidation.

Since diesel automobiles enjoy a high fuel efficiency, they tend to grow quantitatively in the future. Since the removal of $NO_x$ from the exhaust gas of diesel automobiles is very difficult for the reason given above, the measure concerning the $NO_x$ from diesel motor cars poses itself a serious social issue.

Heretofore, among various means for the removal of $NO_x$ under an oxidizing atmosphere, the method of selectively reductive removal of nitrogen oxides using ammonia ($NH_3$) as a reducing agent has been accepted as one even under an oxidizing atmosphere in inducing the selective reaction of $NO_x$ with ammonia without being affected by the oxygen concentration in the exhaust gas. Thus, it has been widely applied to the purification of the exhaust gas from such stationary sources as boilers and furnaces in a thermal power plant, for example.

As a measure for controlling the flow volume of ammonia in the method of ammonia-selectively reductive removal of nitrogen oxides, there has been employed a method which comprises determining the total $NO_x$ content of the exhaust gas by multiplying the signal of the exhaust gas flow volume issuing from an exhaust gas flow volume detector by the $NO_x$ concentration signal issuing from an $NO_x$ concentration measuring device adapted to measure the $NO_x$ concentration in the exhaust gas, then determining the ammonia gas flow volume by multiplying the total $NO_x$ content mentioned above by the prescribed $NH_3/NO_x$ ratio, and feeding the resultant output signal to an ammonia flow meter to control the flow of ammonia gas in conformity with the variation in the $NO_x$ content of the exhaust gas due to the variation in the load such as of a boiler or a method which comprises detecting the concentration of leaking ammonia at the outlet of a reactor, synchronously actuating an ammonia flow meter so as to lower the concentration of leaking ammonia below a fixed level thereby controlling the amount of ammonia gas to be introduced to the site of reaction.

When the ammonia selective reduction method (SCR method) is employed for the treatment of the exhaust gas from such a mobile source as a diesel automobile, however, since the automobile is rarely driven at a fixed but is mostly operated by randomly repeating such actions as idling, acceleration, slowing, and deacceleration. The temperature, amount, and composition of the exhaust gas proportionately change by the minute. Particularly the $NO_x$ content in the exhaust gas is known to vary remarkably.

Where the $NO_x$ content of exhaust gas is remarkably varied as in the exhaust gas from a diesel automobile for example, it is by all means necessary that ammonia should be supplied in strict conformity with the $NO_x$ content. By the conventional method of ammonia control employed for the removal of the $NO_x$ of the exhaust gas from a stationary source, however, accurate control of the flow volume of ammonia is not easily obtained because the device for the determination of $NO_x$ concentration possesses a relatively slow response speed and there inevitably arises a considerable time lag between the time the $NO_x$ concentration at the inlet of the de-$NO_x$ unit and the ammonia concentration at the outlet of the de-$NO_x$ unit are detected and the time the feed amount of ammonia is adjusted and the feed of ammonia in the adjusted amount is started. As the result, it is extremely difficult to obtain effective removal of the $NO_x$ from the exhaust gas and, at the same time, repress to the fullest possible extent the amount of ammonia suffered to leak in the exhaust gas departing from the site of $NO_x$ removal.

As a means for lowering the $NO_x$ content of the exhaust gas from an internal-combustion engine, a method which effects the diminution of the $NO_x$ content by adding ammonia to the exhaust gas proportionately to the amount of the fuel consumed and passing the resultant mixed gas through a reactor packed with a pelletized catalyst, therein to be subjected to reducing combustion has been known to the art (U.S. Pat. No. 4,403,473). In the case of the method of this nature, it may be safely concluded that the $NO_x$ content in the exhaust gas and the amount of fuel consumed are substantially proportional to each other where the revolution number of the engine is constant- as illustrated in FIG. 1 of the specification of the U.S. patent. Where the revolution number and the torque of the engine simultaneously vary as in the automobile in motion, since the $NO_x$ content and the amount of fuel consumed are not in direct proportion to each other, it is difficult for this method to supply ammonia in strict conformity with the momentarily varying $NO_x$ content. Thus, this method cannot adapt itself to the removal of the $NO_x$ in the exhaust gas from a mobile source.

Any method suitable for efficient removal of the $NO_x$ from the exhaust gas of a diesel automobile in the presence of ammonia has not yet been developed for the reason given above.

An object of this invention, therefore, is to provide a method for the removal of nitrogen oxides from the exhaust gas of a diesel engine.

Another object of this invention is to provide a method for efficient removal by catalytic reduction of the $NO_x$ from the exhaust gas of a diesel engine in the presence of ammonia.

A further object of this invention is to provide a method for the removal of the $NO_x$ from the exhaust gas of a diesel engine automobile in motion by the contact of the exhaust gas with a catalyst in the presence of ammonia, which method permits the removal of the $NO_x$ to be effected efficiently for a long time in spite of any possible sharp variation in the behavior of the exhaust gas and, at the same time, represses to the fullest possible extent the leakage of ammonia in the exhaust gas departing from the site of $NO_x$ removal.

SUMMARY OF THE INVENTION

The various objects described above are accomplished by a method for the removal by catalytic reduction of nitrogen oxides from the exhaust gas of a diesel engine by the use of honeycomb catalyst in the presence of ammonia, which method comprises supplying ammonia to the exhaust gas proportionately to the product of the revolution number of the diesel engine multiplied by the torque thereof.

BRIEF DESCRIPTION OF THE DRAWINGS

FIG. 3 is a flow chart illustrating the operation of an arithmetic unit for working the method of the present invention.

EXPLANATION OF PREFERRED EMBODIMENT

Figure 1:
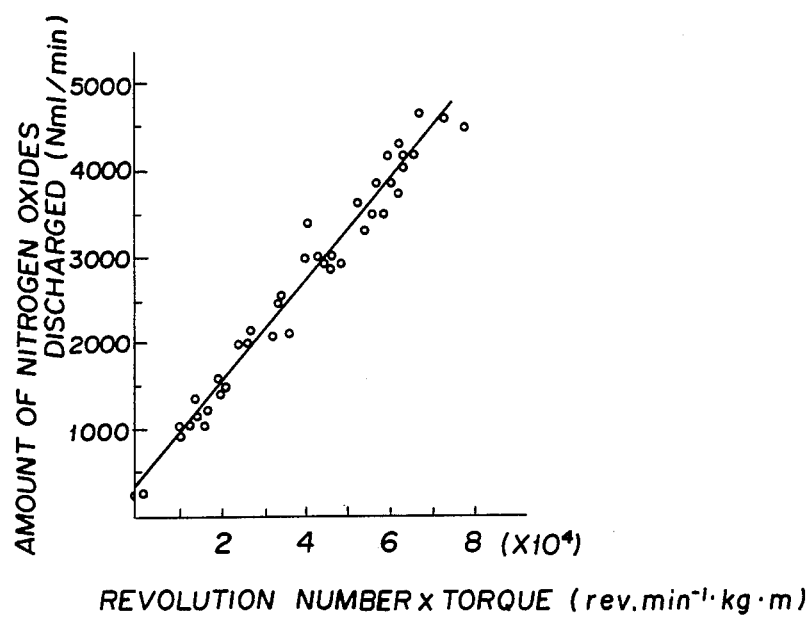
FIG. 1 is a graph showing the relation between the product of the revolution number of the diesel engine multiplied by the torque thereof and the amount of nitrogen oxides discharged in the exhaust gas.

After a diligent study, we have found that the amount nitrogen oxides produced in a diesel engine is in direct proportion to the horsepower of the diesel engine, namely the product of the revolution number of the diesel engine multiplied by the torque thereof. When a diesel engine having a displacement of 6,600 cc and provided with a dynamo was operated at varying revolution numbers, i.e. 550 rpm, (idling), 1,000 rpm, 1,200 rpm, 1,500 rpm, 1,800 rpm, 2,000 rpm, 2,500 rpm, and 3,000 rpm, with the torque varied for each of the revolution numbers to determined the relation between the horsepower, i.e., the product of the revolution number multiplied by the torque, and the amount of nitrogen oxides discharged in the exhaust gas, the results were as shown in the graph of FIG. 1. It is clearly noted from the graph that the horsepower, namely, the product of the revolution number multiplied by the torque, is in direct proportion to the amount of nitrogen oxides discharged over a wide range of engine speed. Thus, it has been ascertained by us that since the amount of ammonia to be supplied can be determined directly based on the revolution number and torque of the engine, the supply of ammonia can be effected in strict conformity with the amount of $NO_x$ to be discharged without any time even when the amount of the exhaust gas and the $NO_x$ content are sharply varied and, as the result, the removal of the $NO_x$ from the exhaust gas can be carried out efficiently.

Figure 2:
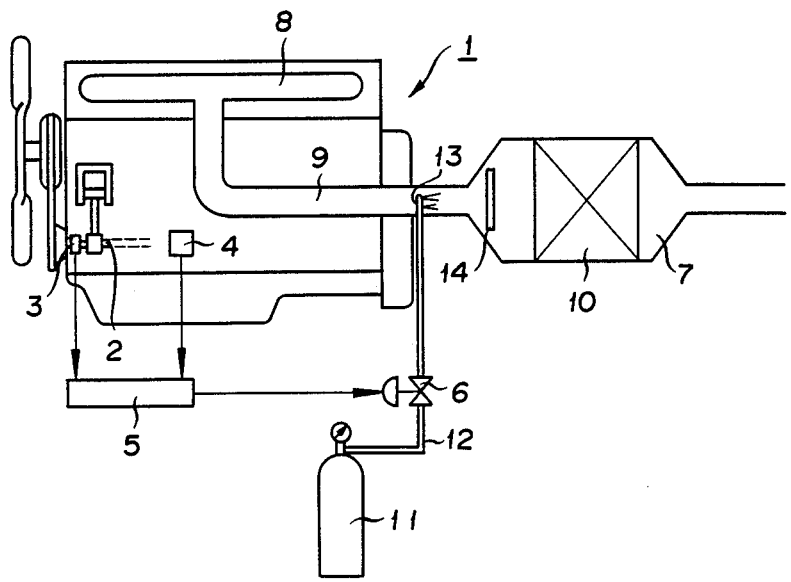
FIG. 2 is a schematic diagram illustrating a diesel engine provided with an exhaust gas purifying device for working the method of this invention.

Now, the present invention will be described in detail below with reference to the schematic diagram of FIG. 2. First, in a diesel engine 1, the signal from an engine revolution number sensor 3 adapted to measure the revolution number of a crank shaft (drive shaft) 2 connected to a piston and the signal from a torque sensor 4 adapted to measure the torque generated by the engine 1 are fed into an arithmetic unit 5. The arithmetic unit 5 incorporates therein a function to carry out the multiplication of the revolution number of engine by the torque and a function to calculate the total amount of nitrogen oxides discharged from the engine and further carries out the multiplication of the outcome of the calculation mentioned above by the prescribed ammonia/$NO_x$ ratio. Then, the output of the arithmetic unit 5 is fed into an ammonia flow volume controller 6 so as to effect control of the amount of ammonia to be mixed with the exhaust gas being supplied to a converter 7. The exhaust gas is forwarded via manifold 8, through an exhaust tube 9 communicating with the manifold 8 and supplied to a reactor 7 packed with honeycomb catalyst 10. Ammonia from an ammonia container 11 is forwarded via a pipe 12, regulated to a necessary flow volume by an ammonia flow volume controller 6, added by an ammonia injection nozzle 13 into the exhaust gas within an exhaust tube 9. The mixture, when necessary, is blended and dispersed with a gas dispersing plate 14 and then passed through the bed of honeycomb catalyst 10 for decomposition of the $NO_x$ component of the exhaust gas by reduction.

The engine revolution number meter is not specifically restricted in terms of mode of operation. It may be mechanical, electrical, or magnetic meter. The torque sensor usable for the measurement of the torque generated by the engine is not specifically restricted in terms of mode of operation.

The arithmetic unit is of a type incorporating therein a microcomputer. Otherwise, an integrated circuit (IC) specifically designed to serve as an arithmetic unit may be used. The operation of the arithmetic unit used herein will be described with reference to FIG. 3.

First, the arithmetic unit 3 makes a decision as to whether or not the power source therefor is turned on by discerning application of voltage upon itself (Step 1). Then, the arithmetic unit 5, on condition that the power source therefor is turned on, admits the electric signal fed out from the engine revolution number sensor 3 in conformity with the engine revolution number and, at the same time, admits the electric signal fed out from the torque sensor 4 in conformity with the torque generated by the engine (Steps 2 and 3). The arithmetic unit 5 then calculates the horsepower based on the electric signals representing the engine revolution number and the generated torque admitted during the course of Steps 2 and 3. It then proceeds to calculate the total amount of nitrogen oxides to be discharged from the engine based on the horsepower. Finally, by multiplying this horsepower by the $NH_3/NO_x$ ratio proportionate to the total amount of nitrogen oxides calculated as described above, the arithmetic unit finds the proper flow volume of ammonia to be supplied from the ammonia container 11 to the catalyst bed (Step 4). Subsequently, the arithmetic unit 5 feeds the outcome of the calculation mentioned above to the ammonia flow volume controller 6. The ammonia flow volume controller 6 is consequently caused to control the amount of ammonia to be injected into the catalyst bed 10 through the ammonia injection nozzle 13 (Step 5). Finally, the arithmetic unit 5 makes a decision as to whether or not the power source therefor is turned off. When the power source therefor is not turned off, the arithmetic unit 5 repeats the processings from Step 2 through Step 6 once again. When the power source thereof is turned off, the processings mentioned above are terminated (Step 6).

As concerns the shape of the honeycomb catalyst to be used for the removal of the $NO_x$ in the present invention, particularly where the catalyst is to be mounted on a diesel automobile such as a truck or bus or on a tractor and, therefore, is required to be accommodated in as compact a reaction container as permissible owing to great restrictions liable to be imposed on the allocation of space, the honeycomb catalyst proves to be desirable because the amount of catalyst required for the treatment decreases in proportion as the geometric surface area thereof increases.

In the honeycomb catalyst, as the geometric surface area of the honeycomb catalyst is increased, the equivalent diameter of the through holes bored therein must be decreased as a natural consequence. The through holes in the catalyst, therefore, are liable to be clogged with the dust entrained in the exhaust gas. With elapse of time, there ensues heavy aggravation of pressure loss of the catalyst bed.

We have continued a diligent study on the shape of the honeycomb catalyst for use on a diesel automobile to reach a conclusion that the equivalent diameter of the through holes bored in the honeycomb catalyst is desired to fall in the range of 1.5 to 5 mm, preferably 2.0 to 4.0 mm.

If the equivalent diameter of the through holes is less than 0.5 mm, there is a disadvantage that the pressure loss is unduly increased and the through holes are liable to be clogged with the dust contained in the exhaust gas. If the equivalent diameter exceeds 5 mm, the catalyst entails a disadvantage that the geometric surface area thereof is decreased and the ratio of denitrification is lowered proportionately. The geometric surface area of the catalyst is desired to be in the range of 600 to 2,00 $m^2/m^3$. If it is less than 600 $m^2/m^3$, the ratio of removal of $NO_x$ is not sufficient. If it exceeds 2,000 $m^2/m^3$, the pressure loss is unduly heavy. The temperature of the exhaust gas of a diesel automobile notably varies with the operating condition of the automobile. When the operation is switched from the idling to the conditions of high load and a large revolution number, for example, the temperature of the exhaust gas at the outlet of the manifold sharply rises from about 150° C. to about 700° C. over a period of about 1 minute.

In this case, the $NH_3$ absorbed on the catalyst is eluted and released into the exhaust gas in consequence of the sharp rise of the temperature of the exhaust gas and threatens to cause secondary air pollution.

When the $NO_x$ in the exhaust gas of the diesel automobile is removed in the presence of ammonia, what measure is to be taken in reducing the amount of ammonia to be eluted from the catalyst during the sharp rise of the temperature of the exhaust gas turns out to be a very important problem.

We have studied this problem to find that the amount of ammonia eluted from the catalyst by the sharp rise of the temperature of the exhaust gas decreases in proportion as the wall thickness of the cell of the honeycomb catalyst decreases. If the wall thickness of cell is decreased excessively, to less than 0.3 mm, for example, the catalyst is so deficient in mechanical strength that it will be unable to withstand the shock liable to be exerted on the automobile body while the automobile is in motion. If the wall thickness of cell exceeds 0.9 mm, the amount of the ammonia to be eluted during the sharp rise of the temperature of the exhaust gas is suffered to increase to an intolerable extent. Thus, the honeycomb catalyst produces desirable results when the wall thickness of the cell is in the range of 0.3 to 0.9 mm.

The honeycomb catalyst exhibits no sufficient impact resistance when the total pore volume thereof is less than 0.25 cc/g and the ratio of the volume occupied by pores measuring not more than 0.05 micron in diameter to the total pore volume is less than 40%.

The honeycomb catalyst which possesses a microporous structure falling in the various ranged mentioned above, therefore, sufficiently ensures the harsh thermal shock inherent in the diesel automobile and produces desirable results.

This invention has no particular reason for discriminating the catalyst in terms of the active component thereof. It has been ascertained to us that the catalyst produces desirable results when the material therefor is composed of 60 to 99.5% by weight of an oxide containing titanium and/or zirconium, labeled as Component A, and 0.5 to 40% by weight of the oxide of at least one element selected from the group consisting of vanadium, tungsten, molybdenum, manganese, cerium, and tin, labeled as Component B.

The catalyst gives desirable results when it uses an oxide containing titanium and/or zirconium as Component A. As examples of the Component A, there can be cited titanium oxide, zirconium oxide, a binary complex oxide of titanium and silicon (hereinafter referred to as "$TiO_2$-$SiO_2$"), a binary complex oxide of titanium and zirconium, and a ternary complex oxide of titanium, silicon, and zirconium. The Component A exhibits a desirable behavior when the specific surface area thereof is not less than 10 $m^2/g$, preferably 20 $m^2/g$.

The catalyst of the present invention can be prepared by the following method, for example. Of course, the preparation of this catalyst need not be limited to this particular method.

The aqueous solution containing such active components as vanadium and tungsten added thereto in conjunction with a molding aid are blended and molded in the form of honeycombs with an extrusion molding machine. The catalyst aimed at produced by drying the honeycombs at a temperature in the range of 50° to 120° C. and then calcining them in a current of air at a temperature in the range of 450° C. to 700° C., preferably 500° C. to 650° C., for a period in the range of 1 to 10 hours, preferably 2 to 6 hours. Alternatively, a method which comprises premolding a powder of $TiO_2$ or $TiO_2$-$SiO_2$, for example, in the form of honeycombs and impregnating the honeycombs with an aqueous solution containing such active components as vanadium and tungsten may be employed for the preparation of the catalyst.

The exhaust gas of the diesel engine to which the present invention is directed generally has a composition containing 10 to 1,000 ppm of $SO_x$, 2 to 21% by volume of oxygen, 5 to 15% by volume of carbon dioxide, 5 to 15% by volume of water, 0.05 to 0.6 g/$Nm^3$ of soot, and about 200 to 3,000 ppm of $NO_x$. It has only to be an exhaust gas emitted from a diesel engine. This invention does not discriminate the exhaust gas on account of its chemical composition.

As regards the conditions of treatment, the reaction temperature is desired to be in the range of 150° to 650° C., preferably 200° to 600° C.

The space velocity of the exhaust gas during the treatment is desired to be in the range of 2,000 to 100,000 $hr^{-1}$, preferably 5,000 to 50,000 $hr^{-1}$.

The amount of ammonia to be added to the exhaust gas is desired to be in the range of 0.3 to 2 parts by volume per part by volume of $NO_x$. Because of the necessity for repressing the leakage of unaltered ammonium in the exhaust gas departing from the site of $NO_x$ removal to the fullest possible extent, it is particularly desirable to use ammonia in such an amount that the molar ratio of ammonia to $NO_x$ will be not more than 1.

Now, the present invention will be described more specifically below with reference to a working example and a control. It should be noted, however, that this invention is not limited to the example.

EXAMPLE $TiO_2$-$SiO_2$ was prepared by the following procedure. As a titanium source, an aqueous sulfuric acid solution of titanyl sulfate of the following composition was used.

$TiOSO_4$ (as $TiO_2$)—250 g/liter
Total $H_2SO_4$—1,100 g/liter

Separately, 715 liters of aqua ammonia ($NH_3$, 25%) was added to 1,000 liters of water and 60 kg of silica sol having an $SiO_2$ content of about 30% by weight (produced by Nissan Chemicals Industries, Ltd. and marketed under trademark designation of "Snowtex NCS-30") was added to the resultant mixed solution. To the solution consequently obtained, a dilute aqueous titanium-containing sulfuric acid solution obtained by adding 750 liters of water to 382 liters of the aqueous sulfuric acid solution of titanyl sulfate was gradually added dropwise to give rise to a coprecipitated gel. Then, the solution containing the gel was left standing at rest for 15 hours. The $TiO_2$-$SiO_2$ gel thus produced in the solution was separated by filtration, washed with cold water, and then dried at 200° C. for 10 hours.

The dry gel was then calcined in the atmosphere of air at 550° C. for 6 hours, crushed with a hammer mill, and classified with a classifier, to collect a powder having an average particle diameter of 20 microns.

The powder thus produced had a composition of Ti:Si=4:1 (atomic ratio) and BET surface area of 180 $m^2$/g.

In a mixture consisting of 3 liters of monoethanolamine with 35 liters of water 7.55 kg of ammonium paratungstate was dissolved and then 2.47 kg of ammonium metavanadate was dissolved, to produce a homogeneous solution. In a kneader, this solution and 80 kg of the powder were added together wtih a molding aid and were vigorously stirred with continued addition of a suitable amount of water. The resultant mixture was molded with an extrusion molding machine in the form of a lattice measuring a square of 150 mm in visible sectional area and 650 mm in length. Then, the lattice was dried at 60° C. and calcined in a current of air at 470° C. for 5 hours. The finished catalyst thus obtained had a $V_2O_5$ content of 2% by weight and a $WO_3$ content of 7% by weight.

The honeycomb catalyst thus obtained was found to possess an equivalent through hole diameter of 3.2 mm, a cell was thickness of 0.5 mm, a geometric surface area of 910 $m^2/m^3$, and a total pore volume of 0.42 cc/g. The volume occupied by pores measuring not more than 0.05 micron was 63% of the total pore volume.

Two honeycomb catalysts of the foregoing description were parallelly disposed in a converter placed so as to communicate with the exhaust pipe of an automobile diesel engine having a displacement of 6,600 cc. The diesel engine 1 which was provided with an engine revolution number sensor 3, a torque sensor 4, an arithmetic unit 5, and an ammonia flow volume controller (solenoid valve) 6 as illustrated in FIG. 2 was operated in Mode 6, the standard conditions specified for use in the test of diesel automobile for $NO_x$ tolerance, with the ammonia from an ammonia container 11 injected into the exhaust gas within an exhaust tube at a flow rate so controlled with the arithmetic unit 5 as to keep the ammonia/$NO_x$ molar ratio at a constant level 0.8. During this operation, the ratio of $NO_x$ removal and the amount of ammonia leaking in the departing exhaust gas were determined as hourly averages. The results were as shown in Table 1.

Control

The procedure of the example described above was repeated, excepting the $NO_x$ concentration in the exhaust gas was determined with an automatic nitrogen oxide measuring unit attached to the exhaust pipe 9 in the place of the torque sensor. In this setup, the amount of the exhaust gas was determined by causing the revolution number sensor to detect the engine revolution number generated by the engine and feeding the output signal from the revolution number sensor into the arithmetic unit. In the meantime, an $NO_x$ measuring unit detected the $NO_x$ concentration in the exhaust gas and fed the output signal thereof to the arithmetic unit. This arithmetic unit calculated the total amount of $NO_x$ in the exhaust gas, based on the amount of the exhaust gas and the $NO_x$ concentration. The amount of ammonia to be fed was calculated by multiplying the total amount of $NO_x$ by the prescribed ammonia/$NO_x$ ratio. The corresponding signal of the product was forwarded to the ammonia flow volume controller. Then, the ammonia was injected via the ammonia injection nozzle into the exhaust pipe. The resultant mixture of ammonia and the exhaust gas was led to the honeycomb catalyst bed inside the converter. The results were as shown in Table 1.

TABLE 1

|  | Example | Control |
| --- | --- | --- |
| Average inlet $NO_x$ concentration (ppm) | 480 | 480 |
| Ammonia/$NO_x$ (molar ratio) | 0.8 | 0.8 |
| Average outlet $NO_x$ concentration (ppm) | 102 | 230 |
| Average ratio of $NO_x$ removal (%) | 78.7 | 52.1 |

TABLE 1-continued

| | Example | Control |
|---|---|---|
| Average ammonia leakage | 4 | 150 |

The method for removal of $NO_x$ described in the Example removed nitrogen oxides efficiently as compared with the method for removal of $NO_x$ described in the Control. The former method suffered very little leakage of unaltered ammonia, a possible cause for secondary air pollution and, thus, proved to be a highly satisfactory measure for the removal of $NO_x$ from the exhaust gas of a diesel automobile.

What is claimed is:

1. A method for the removal of nitrogen oxides from the exhaust gas of a diesel engine through catalytic reduction by the use of a honeycomb catalyst in the presence of ammonia, which method comprises feeding ammonia into said exhaust gas proportionately to the product of the revolution speed of said diesel engine multiplied by the transmitted torque of said diesel engine.

2. A method according to claim 1, wherein the amount of ammonia to be fed is in the range of 0.3 to 2 parts by volume per one part by volume of $NO_x$.

3. A method according to claim 2, wherein said revolution speed of engine is detected by an engine revolution speed sensor and said torque is detected by torque meter, the two output signals from said sensors are calculated in an arithmetic unit, and the outcome of said calculation is fed into an ammonia flow volume control unit to effect control of the flow volume of ammonia.

4. A method according to claim 3, wherein the reaction temperature of the catalyst bed is in the range of 150° to 650° C. and the space velocity of the exhaust gas through the catalyst bed is in the range of 2,000 to 100,000 $hr^{-1}$.

5. A method according to claim 4, wherein the through holes in the catalyst possess an equivalent diameter in the range of 1.5 to 5 mm and the geometric surface area of the catalyst is in the range of 600 to 2,000 $m^2/m^3$.

6. A method according to claim 5, wherein the wall thickness of cell of the catalyst is in the range of 0.3 to 0.9 mm.

7. A system for the removal of nitrogen oxides from the exhaust gas of diesel engine, formed by providing a diesel engine with an arithmetic unit, an engine revolution speed sensor adapted to detect the revolution speed of said diesel engine and interconnected to said arithmetic unit, a torque meter adapted to detect the transmitted torque generated by said diesel engine and interconnected to said arithmetic unit, an ammonia flow volume controlling valve interconnected to an ammonia source adapted to effect control of the flow volume of ammonia by the signal received from said arithmetic unit, and an ammonia feed pipe connected to said ammonia flow volume controlling valve and to a converter packed with a honeycomb catalyst and fitted with a nozzle opening into the exhaust tube.

8. A system according to claim 7, wherein said arithmetic unit is adapted to calculate the product of the revolution speed of engine multiplied by the transmitted torque of engine and control the flow volume of ammonia proportionately to the outcome of the multiplication.

* * * * *

UNITED STATES PATENT AND TRADEMARK OFFICE
CERTIFICATE OF CORRECTION

PATENT NO. : 4,854,123

DATED : August 8, 1989

INVENTOR(S) : Motonobu Kobayashi et al

It is certified that error appears in the above-identified patent and that said Letters Patent is hereby corrected as shown below:

On the title page Inventors should read

--Motonobu Kobayashi, Himeji, Japan; Futoru Kinoshita, Himeji, Japan; Kiichiro Mitsui, Akashi, Japan; and Akira Inoue, Hirakata, Japan--.

Signed and Sealed this

Fifth Day of June, 1990

Attest:

HARRY F. MANBECK, JR.

*Attesting Officer*    *Commissioner of Patents and Trademarks*